Patented Jan. 16, 1951

2,538,557

UNITED STATES PATENT OFFICE 2,538,557

SULFANILAMIDOPYRIMIDINE-FORMALDE-HYDE CONDENSATION PRODUCTS

Jean Druey, Riehen, Switzerland, assignor to Ciba Pharmaceutical Products, Inc., Summit, N. J.

No Drawing. Application November 6, 1947, Serial No. 784,518. In Switzerland December 19, 1946

3 Claims. (Cl. 260—239.75)

The present invention relates to therapeutically useful sulfanilamidopyrimidine-formaldehyde condensation products.

Of the known $N^1$-substituted sulfa drugs, those are particularly potent which contain certain heterocyclic rings in the $N^1$-position. Among the relatively more potent of these products are the sulfanilamidopyrimidines of the formula

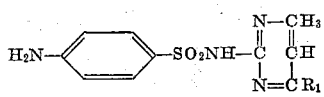

wherein $R_1$ represents a hydrogen atom or a methyl group.

The provision of sulfanilamidopyrimidine derivatives of even greater therapeutic usefulness than the said sulfanilamidopyrimidines themselves is a manifest desideratum. This desideratum is now realized according to the present invention by means of the formaldehyde condensation products of the said sulfanilamidopyrimidines.

The results obtained according to the invention could by no means be foreseen. Thus, it was not obvious that the new condensation products could be made at all. Moreover, there was real reason to believe that, even if the products could be made, it would not be possible to isolate them in a form suitable for therapeutic use. Thus, certain sulfanilamides of the heterocyclic series yield only indeterminate greasy reaction products with formaldehyde, and are wholly unsuited for therapeutic use.

Unexpectedly, however, the new condensation products are readily formed and may be isolated in the therapeutically useful form. Moreover, as compared with the parent sulfanilamidopyrimidines themselves, the new compounds exhibit more valuable properties.

The new condensation products are made by reacting a sulfanilamidopyrimidine of the foregoing formula with formaldehyde. Instead of formaldehyde itself, formaldehyde-yielding materials such as paraformaldehyde or hexamethylenetetramine may also be used. The reaction may be carried out advantageously in the presence of a diluent, such as water or a dilute acid.

The products of the invention find application as medicaments, being capable of administration orally, topically or otherwise, for example intramuscularly in the form of suspensions.

The following examples illustrate the preparation of the new compounds according to the invention. The "parts by weight" bear the same relation to the "parts by volume" as do grams to cubic centimeters.

Example 1

26.4 parts by weight of 2-sulfanilamido-4-methylpyrimidine are suspended in 260 parts by volume of water, and brought into solution by the addition of 40 parts by volume of concentrated hydrochloric acid. 15 parts by volume of 40% aqueous formaldehyde solution are then gradually added dropwise, while stirring thoroughly. The reaction product soon begins to separate in fine form. After all the formaldehyde solution has been added, it is allowed to stand for one hour. The reaction product is then separated by suction filtration, thoroughly washed with water, suspended in water, the last traces of acid neutralized with sodium carbonate solution, the whole suction-filtered, and the separated precipitate dried at 50° C. In this manner, 28 parts by weight of a light yellowish powder are obtained, which is insoluble in acids, but is soluble in dilute alkalies.

Example 2

27.8 parts by weight of 2-sulfanilamido-4,6-dimethylpyrimidine are dissolved in 300 parts by volume of approximately 1.5-normal hydrochloric acid. A total of 15 parts by volume of 40% aqueous formaldehyde solution are then added thereto dropwise, while stirring. After a short time the reaction solution becomes turbid, and the reaction product gradually precipitates in flocculent form. After standing for a short time, the precipitate is separated by suction filtration. The condensation product thus obtained is further worked up in the manner described in Example 1. It is a fine, nearly white powder, which is soluble in caustic soda solution.

Having thus described the invention, what is claimed is:

1. An alkali-soluble, crystalline formaldehyde condensation product of a sulfanilamidopyrimidine of the formula

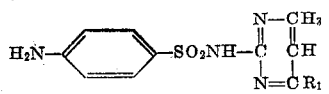

wherein $R_1$ represents a member selected from the group consisting of hydrogen and methyl, which has valuable therapeutic properties, and is obtained by carrying out the condensation reaction in an inert diluent.

2. The crystalline condensation product of 2-sulfanilamido-4-methyl-pyrimidine with formaldehyde, which has valuable therapeutic properties, is alkali-soluble, and is obtained by carrying out the condensation reaction in an inert diluent.

3. The crystalline condensation product of 2-sulfanilamido - 4,6 - dimethyl - pyrimidine with formaldehyde, which has valuable therapeutic properties, is alkali-soluble, and is obtained by carrying out the condensation reaction in an inert diluent.

JEAN DRUEY.

REFERENCES CITED

The following references are of record in the file of this patent:

UNITED STATES PATENTS

| Number | Name | Date |
|---|---|---|
| 2,268,780 | Shonle | Jan. 6, 1942 |
| 2,407,966 | Sprague | Sept. 17, 1946 |

OTHER REFERENCES

Hug: Chem. Abstracts, vol. 29 (1935), p. 752.
Chem. Abst., vol 40, p. 3735 (July 1946).
Carro Collazo: Farmacologia y Terapeutica Actual (Madrid), vol. 3, No. 19, pp. 39–44 (1946).